Figure 1:

July 26, 1938. T. W. RANSON 2,125,052
CHILD IDENTIFICATION DEVICE
Filed July 3, 1936  2 Sheets-Sheet 1

INVENTOR.
THOMAS W. RANSON
BY
ATTORNEY.

July 26, 1938.    T. W. RANSON    2,125,052
CHILD IDENTIFICATION DEVICE
Filed July 3, 1936    2 Sheets-Sheet 2

INVENTOR.
THOMAS W. RANSON
BY Clarence A. O'Brien
ATTORNEY.

Patented July 26, 1938

2,125,052

UNITED STATES PATENT OFFICE 2,125,052

CHILD IDENTIFICATION DEVICE

Thomas W. Ranson, Cleveland, Ohio, assignor to The Ranson Interlocking Marking System Inc., a corporation of Ohio Application July 3, 1936, Serial No. 88,891

2 Claims. (Cl. 70—263)

This invention relates to identification devices and especially to an identification device for use in hospitals to identify a mother and her new born child, in order to prevent or guard against the possibility of the child being accredited to the wrong person.

It is the custom, at present, as soon as the child is born to remove the child from the presence of the mother and generally to an adjoining room, where the child is washed and attended to. After the child has been washed it is customary to affix a marker to the child, on which is recorded the name of the mother and other identification data. This marker is pasted or secured to the body of the child by a suitable adhesive substance.

This method of identification does not in all instances positively identify the child. Most mixups or mistakes occur during the first washing and dressing, before the child has been identified in any manner whatever. Later on there is a chance of mistakes occurring through the marker coming off due to subsequent bathings and there is always a possibility of errors being made by the recorder who prepares the marker.

Even where no mistakes actually occur many mothers are caused mental distress due to doubts caused by this uncertain method of identifying the child.

The general object of this invention, therefore, is to provide an identification device which will both identify the child with the mother and the mother with the child and which will be capable of being applied to both the mother and the child immediately after the birth of the child and before the child has been separated from the mother.

A further object is to provide an identification device, the use of which will assure the mother that she has her own child.

Another object is to provide an identification device for a new born child, which will identify the child with its mother, and wherein the device will not rely on names, numbers or other marks which may be inadvertently obliterated.

A more specific object is to provide an identification device which will identify a new born child with its mother and wherein the device cannot ordinarily be removed from the child without the mother being present and cannot be removed from the mother without the child being present.

Other objects of this invention will become apparent from the following description, which refers to a preferred embodiment, illustrated in the drawings. The essential characteristics will be set forth in the claims.

Figure 2:
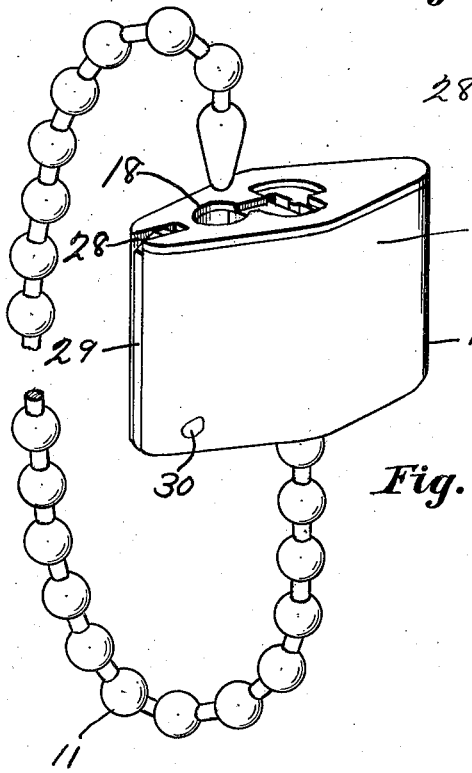
Figure 3:
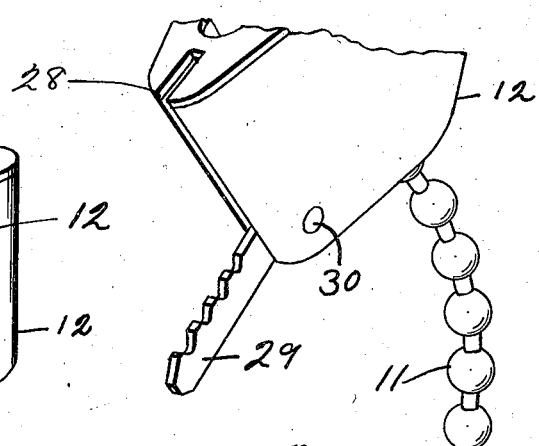
Figure 4:
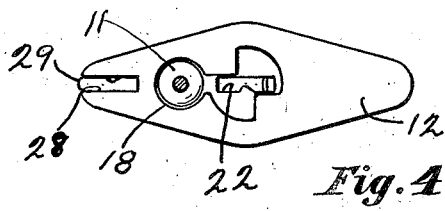
Figure 6:
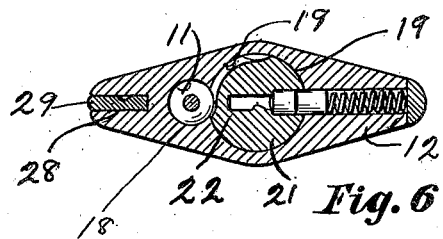
Figure 5:
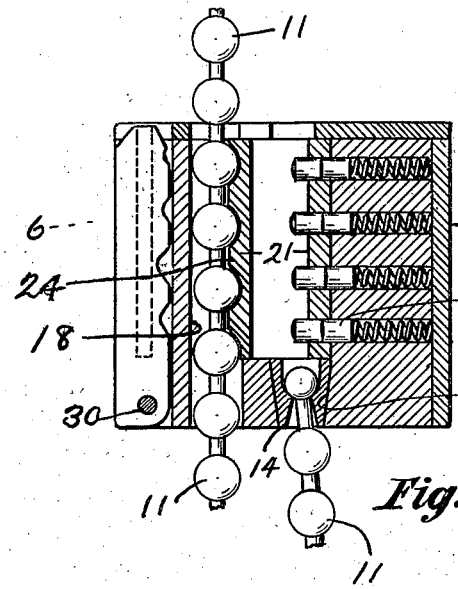
Figure 7:
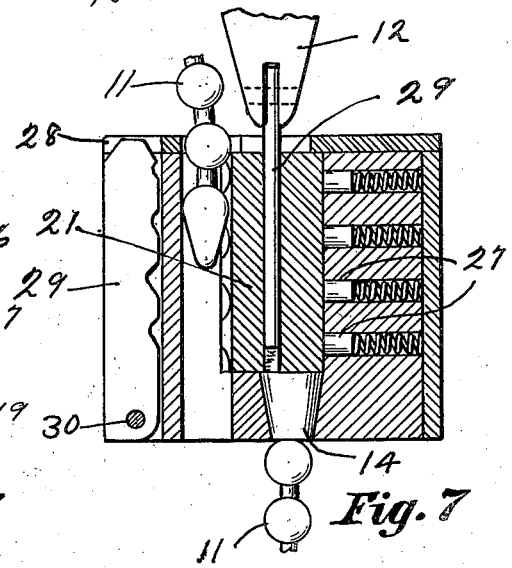
Figure 8:
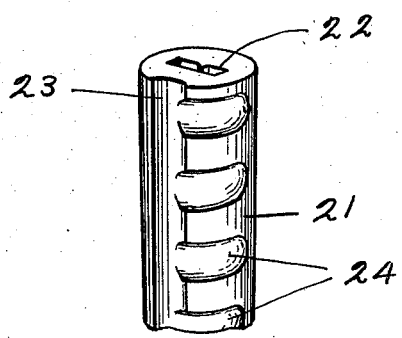
Figure 9:
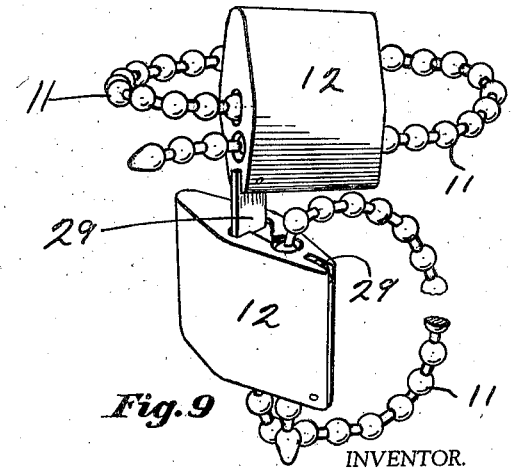

In the drawings Fig. 1 is a view illustrating the use of my identification device; Fig. 2 is a perspective of the device. Fig. 3 is a detail view to show the mounting of the key. Fig. 4 is a bottom planned view. Fig. 5 is a central vertical section. Fig. 6 is a section on line 6—6, Fig. 5. Fig. 7 is a view similar to Fig. 5 showing unlocked position. Fig. 8 is a view of lock barrel. Fig. 9 is a view of a pair of units brought together for unlocking.

My device comprises a pair of bracelet-like members which will hereafter be referred to as bands, one of which 10a, is secured to the mother's arm, and the other 10b is secured to the body of the infant. As shown in Fig. 1, the device 10b is used as a necklace, however I contemplate that it may be used in various ways, for example it may be brought over one shoulder and beneath the other armpit. However it must be secured to the child so that the encircling band 11 is locked, the device cannot be slid from the body of the child but will have to be unlocked as hereinafter described.

The encircling bands 11 may be made of any suitable material which is flexible and durable but preferably of a hard or tough metal which cannot readily be filed or cut. However, metal, cloth or chain may be used for either or both units if desired. I have shown these bands in the form of chains, involving a series of balls and connecting links.

The ends of the respective bands 11 are designed to be secured together by suitable locking means 12, there being one lock for each band. One end of each band is permanently secured in any well known manner to its respective lock, as at 14, while the other or free end is adapted to be locked in the lock 12 by suitable key operated locking means.

The lock 12 may comprise a hollow rectangular casing which provides a housing for the key, a chamber for the lock-barrel, mountings for the tumblers and a bore for receiving the free end of the chain.

The lock casing has two vertically arranged bores 18 and 19, which are placed closely together so that for a portion of their length they merge or communicate with each other. The bore 18 is designed to receive the free end of the band.

In the bore 19 is arranged a barrel 21 which has the usual key receiving slot 22. On the outer surface of the barrel is formed a semi-circular vertically arranged groove 23 and a series of transverse grooves 24 which communicate with the groove 23 and which are spaced apart to correspond with and to receive the balls of the chain 11.

A suitable number of spring controlled tumblers 27 are provided in the usual manner for engagement with the barrel and are adapted to be actuated by the key in the usual manner.

In the side of the lock casing is provided a recess 28 for the reception of a key 29, which may be pivotally secured therein by a pin 30.

The units are made in pairs, one for the mother and one for her child, the key of the mother's unit is adapted to lock and unlock the lock of the child's unit and vice versa.

The operation of the device is as follows; the key of the mother's unit is inserted in the child's unit and the band is locked in place on the child's neck; the key to the child's unit is then placed in the lock of the mother's unit and the band is locked in place on the mother's arm. The keys are then shoved back in their respective recesses. The child is then separated from the mother.

From the foregoing description it will be seen that I have provided an identification device comprising a pair of bracelet-like members or units which may be secured to the person of the mother and child respectively. Each member includes a key adapted to unlock the other and wherein the keys cannot be detached from their respective casings. It will also be seen that the device is so constructed that it would be very difficult to use the key of the mother's device without her knowledge.

I claim:

1. In a device of the character described, a casing, a flexible band comprising a series of balls and connecting links, one end of said band being attached to the casing, means located within the casing and adapted to secure the other end of the band to the casing, said means comprising a barrel having on its outer surface a semi-circular vertically arranged groove and a series of transverse grooves adjacent said vertically arranged grooves and communicating therewith for the reception of the balls of the flexible band, and means including key-operated tumblers adapted to lock the securing means in an engaging position relative to the band.

2. In an identification device including a pair of lock casings, the combination of flexible bands each secured at one end to said casings, and means within each casing for releasably locking the other end of each band thereto, said releasable locking means of one casing being operable by a key permanently secured to the other casing.

THOMAS W. RANSON.